(12) United States Patent
Voegtlin

(10) Patent No.: US 7,650,880 B2
(45) Date of Patent: Jan. 26, 2010

(54) COOKING OVEN FOR BREAD, PATISSERIE AND PASTRIES OR SIMILAR

(75) Inventor: René Voegtlin, Oberhausbergen (FR); Suzanne nee Weber Voegtlin, legal representative, Oberhausbergen (FR)

(73) Assignee: MECATHERM, Société Anonyme, Barembach (FR)

( * ) Notice: Subject to any disclaimer, the term of this patent is extended or adjusted under 35 U.S.C. 154(b) by 0 days.

(21) Appl. No.: 11/569,673

(22) PCT Filed: May 10, 2005

(86) PCT No.: PCT/FR2005/050310

§ 371 (c)(1),
(2), (4) Date: Jul. 13, 2007

(87) PCT Pub. No.: WO2005/117593

PCT Pub. Date: Dec. 15, 2005

(65) Prior Publication Data

US 2007/0272224 A1    Nov. 29, 2007

(30) Foreign Application Priority Data

Jun. 1, 2004    (FR) .................................. 04 51081

(51) Int. Cl.
*F24C 15/32* (2006.01)

(52) U.S. Cl. ................ 126/21 A; 126/21 R; 126/41 C; 126/15 A; 99/339; 99/443 C; 99/386; 432/148; 432/199

(58) Field of Classification Search ............... 126/21 A, 126/21 R, 39 J, 41 C, 15 A; 432/148, 199, 432/152, 202; 219/400, 653; 99/339, 443 C, 99/386, 401
See application file for complete search history.

(56) References Cited

U.S. PATENT DOCUMENTS

| | | | | |
|---|---|---|---|---|
| 3,581,679 A | * | 6/1971 | Jansen et al. | ................. 432/199 |
| 4,529,379 A | * | 7/1985 | DiCastri | ...................... 432/148 |
| 4,800,865 A | * | 1/1989 | Setzer | ....................... 126/21 R |
| 4,960,100 A | * | 10/1990 | Pellicane | .................. 126/21 A |
| 4,962,694 A | * | 10/1990 | Graver | ......................... 99/339 |
| 5,131,841 A | * | 7/1992 | Smith et al. | .................... 432/59 |
| 5,154,160 A | * | 10/1992 | Burtea et al. | .............. 126/21 A |
| 5,839,354 A | * | 11/1998 | Cardillo | .................. 99/329 RT |
| 6,936,793 B1 | * | 8/2005 | Shiloh et al. | ................ 219/400 |

* cited by examiner

*Primary Examiner*—Steven B McAllister
*Assistant Examiner*—Avinash Savani
(74) *Attorney, Agent, or Firm*—Egbert Law Offices PLLC

(57) ABSTRACT

The invention relates to a cooking oven for bread, patisserie and pastry products or similar, including at least one cooking chamber with a fixed or moving floor, on which products are supported during cooking, whether directly or on a suitable cooking support, such as a plate a mesh or a cooking mold. There is also a radiant heating device for the floor arranged under the floor, called a floor hotplate. The floor and the floor hotplate have a space therebetween, the space being provided for closed-circuit convective circulation of a heating fluid, the floor having a permeable embodiment for a complementary heating of the products through the same by convection. The oven permits a combination at the floor of heating by conduction and radiation with heating by convection.

10 Claims, 2 Drawing Sheets

COOKING OVEN FOR BREAD, PATISSERIE AND PASTRIES OR SIMILAR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention relates to a baking oven for bread, patisserie, pastries or the like, including at least one baking chamber, with a movable or fixed floor, on which products rests during baking, either directly or through an adapted baking support, such as a plate, a net or a baking mold, under the floor being provided radiant heating means for the floor, called floor hotplate.

The present invention is related to the field of the baking ovens for bread, patisserie, pastries or the like.

2. Description of Related Art Including Information Disclosed Under 37 CFR 1.97 and 37 CFR 1.98.

There are already known baking ovens meeting the above description, the operation of which is discontinuous or continuous. In the first case, the oven is capable of containing a certain quantity of products, called load. It is extracted therefrom at the end of baking, leaving room for baking a new load. In the case of a continuous baking oven, the products are conveyed through the baking chamber by suitable conveying means between an inlet and an outlet, the time of transit corresponding to the baking time.

For the charging and the evacuation of a load of products in discontinuously operating ovens or also for the transit of these products through continuously operating ovens, the floor of the baking chamber, on which said products rest, either directly or through an adapted baking support, such as a plate, a net or a baking mold, can be designed movable, for example in the form of a sliding tray, in particular in the case of a floor called outgoing floor, or a suitable baking carpet. This carpet can be of a metallic type or made out of synthetic material or also with articulated stone or metal blades.

The ovens more particularly involved by the present invention are those in which the products to be baked are in direct contact or through their baking support with the floor of the baking chamber, which floor is subjected to adapted heating means.

In particular, under this plate can be implanted heating resistors, heating-fluid conduits or any other heat-producing means.

In the following description, these heating means extending at least partially under the floor will be called floor hotplate.

Thus, the products are baked partly by conduction through this floor, knowing that they are in addition submitted to baking by radiant heating and/or by convection.

The radiation results from the dispersion of heat from the floor and the vault of the baking chamber loaded with heat. In this respect, the vault is it also provided with heating means.

These products can also be baked by convection by a heating fluid moving in the baking chamber. Some ovens simultaneously implement these three heating modes: conduction, radiation, convection, in order to ensure the baking of the products. In particular, this consists in an oven as described above, comprising a heated floor and vault, in subjecting the air of the baking chamber to adapted stirring means.

When the products are placed on the floor, directly or through a baking support, the calories are directly absorbed by the products in the area of contact, so that the floor must locally be reloaded with heat-energy through the floor hotplate, so that the baking operation continues. A heating of the floor by mere radiation through said floor hotplate has some inertia, which results into decelerating the baking operation by conduction and radiation through the floor. The phenomenon is enhanced when the products rest on this floor through baking supports that, although they are generally open worked, provide a barrier for the heating by radiation and increase the inertia of the transfer of calories by conduction from the floor to the products.

The result is a baking which does not take place under identical conditions on the top and the sides of the products with respect to the lower side of the latter directly or indirectly into contact with the floor.

BRIEF SUMMARY OF THE INVENTION

The present invention tries to solve this drawback by providing a solution which allows coping with these problems of inertia when reloading a floor with heat-energy or transferring calories towards the products.

Within the framework of an inventive step has been imagined the possibility of combining at the level of the floor a heating by conduction and radiation with a heating by convection.

To this end, the invention relates to a baking oven for bread, patisserie, pastries or the like, including at least one baking chamber with a movable or fixed floor, on which said products rest during baking, either directly or through an adapted baking support, such as a plate, a net or a baking mold, under said floor being provided radiant heating means for the floor, called floor hotplate, characterized in that between the floor and the heating means for the floor is provided a space for closed-circuit convective circulation of a heating fluid, said floor being designed permeable for complementary heating by convection of the products through the latter.

Moreover, the floor is designed capable of being heated by radiation through the space for convective circulation of a heating fluid by said floor hotplate.

Advantageously, said floor is defined by a fully or partly open worked plate or a baking carpet, even by a grid or a net, spaced apart from the floor hotplate.

According to a preferred embodiment, said floor, in the form of a baking carpet, is supported by the upper edge of slides extending above the floor hotplate while forming a spacer.

Thus, said slides define channels in the space for convective circulation of a heating fluid.

The baking oven according to the invention includes means for putting convective heating fluid into closed-circuit circulation in said space.

In a preferred way, said means of putting into circulation advantageously include a stirring device, heating means for said fluid, and means for conveying the fluid from a suction mouth at one end of the floor towards a discharge mouth at an opposite end of this floor.

Said means for heating the fluid are formed by the floor hotplate.

Said slides extend continuously or discontinuously from the discharge mouth towards the suction mouth.

In a particular embodiment of the invention, said floor can be movable.

In this case, said slides are oriented substantially parallel to the direction of displacement of said floor, and are slightly divergent on both sides of the longitudinal median plane of the oven and in the direction of circulation of the convective heating fluid.

The invention also relates to a baking device made up of several modules, each module comprising a baking chamber, at least one of the modules being defined by a baking oven according to the invention.

Other features and advantages of the invention will become clear from the following detailed description relating to exemplary embodiments shown in the figures of the attached drawings.

DETAILED DESCRIPTION OF THE INVENTION

Figure 1:
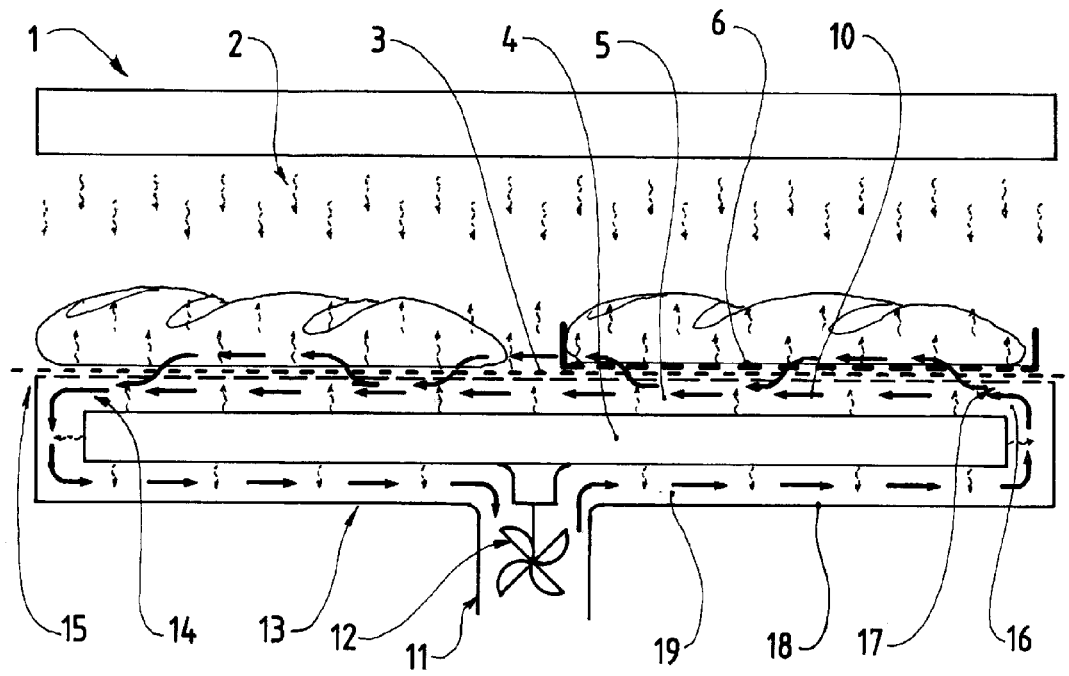
FIG. 1 is a cross-sectional view of an embodiment of a baking oven according to the invention.

The invention relates to a baking oven 1, visible in FIG. 1, comprising a baking chamber 2 provided with a floor 3 and adapted heating means 4. The latter extend fully or partly under the floor 3 and will be called floor hotplate 4 in the following description. This floor hotplate 4 heats the floor 3 by radiation or conduction.

A heating by convection can advantageously be added to complete the existing heating means. To this end, a space 5 is provided between said floor 3 and said floor hotplate 4 in order to allow a closed-circuit convective circulation of a heating fluid.

Through this convection, the transfer of heat is accelerated and the above-mentioned problems of inertia are coped with.

The floor 3 is advantageously designed capable of being heated by radiation, by the floor hotplate 4, through this space 5 for convective circulation of a heating fluid.

According to another peculiarity of the invention, the floor 3 is designed permeable, in order to allow complementary heating by convection of the products which rest on it, directly or through adapted baking supports 6. These two solutions have been schematically shown in FIG. 1.

In particular, this floor 3 can be defined by a plate fully or partially open worked by means of perforations, for example in the case of a so-called oven with outgoing sole, or can be, as shown in FIG. 1, in the form of a baking carpet, this sole being spaced apart from the floor hotplate 4.

In a preferred embodiment, the floor 3, defined by a baking carpet, rests on the upper edge 7 of slides 8 extending above the floor hotplate 4 while forming spacers.

It should be noted that this design has the advantage of maintaining, even favoring the heating by radiation, by the floor hotplate 4, of the floor 3 which is defined by the baking carpet. In this way, it is possible to ensure the baking of the products by simple radiation through the floor.

The slides 8 define, in the space 5, convective heating-fluid circulation channels 9. Thus, these slides 8 are oriented substantially parallel to the direction of circulation 10 of the convective heating fluid under the floor 3. Besides, the baking oven also includes means 11 for putting the convective heating fluid into closed-circuit circulation in said space 5. These means 11 include, first of all, a stirring device 12, such as a fan or the like, as well as means 13 for conveying the fluid from a suction mouth 14, at an end 15 of the floor 3, towards a discharge mouth 16, at an opposite end 17 of this floor 3, while passing through said stirring device 12, as well as means for heating said fluid.

In particular, these heating means may consist of the floor hotplate 4 alone or in combination with an additional heating device, not shown.

The conveying means 13 are advantageously defined by the floor hotplate plate 4 itself, and a jacket 18 surrounding the latter fully or partly while defining a conduit 19 communicating with the suction mouth 14 and the discharge mouth 16.

In this context, said slides 8 can extend continuously or discontinuously from the discharge mouth 16 to the suction mouth 14.

In such a construction, under the action of the stirring device 12 and because of the permeability of the floor 3, the convective heating fluid can lick the products resting directly on the floor 3 or through baking supports 6, without therefore penetrating into the chamber 2 and modifying the baking conditions for the products on top of them.

It should however be noticed that, in the case of a baking oven according to the invention that does not include a permeable floor, the heating by convection has the advantage of accelerating the heat exchange between the floor hotplate 4 and the said floor 3.

As explained in the introductory part, the floor 3 can be designed movable in the form of a sliding plate or of a suitable baking carpet. Of course, this movable plate or baking carpet itself is designed open worked, so that this floor meets the characteristics of permeability according to the invention.

Figure 2:
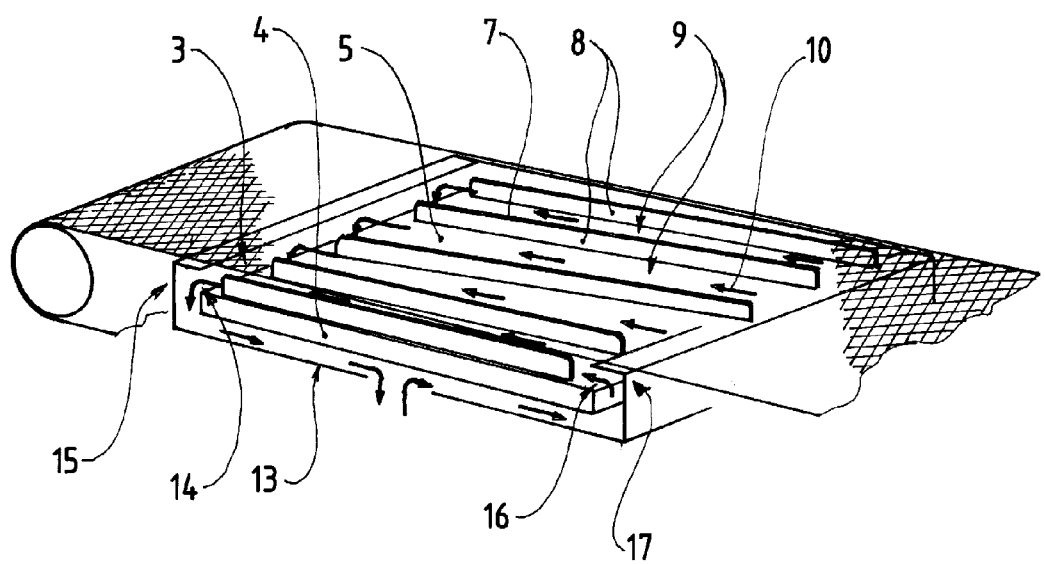
FIG. 2 is a partial schematic and partial perspective view of the floor in the form of a baking carpet under which is provided the floor hotplate as well as, according to the invention, a space for closed-circuit convective circulation of a heating fluid.
Figure 3:
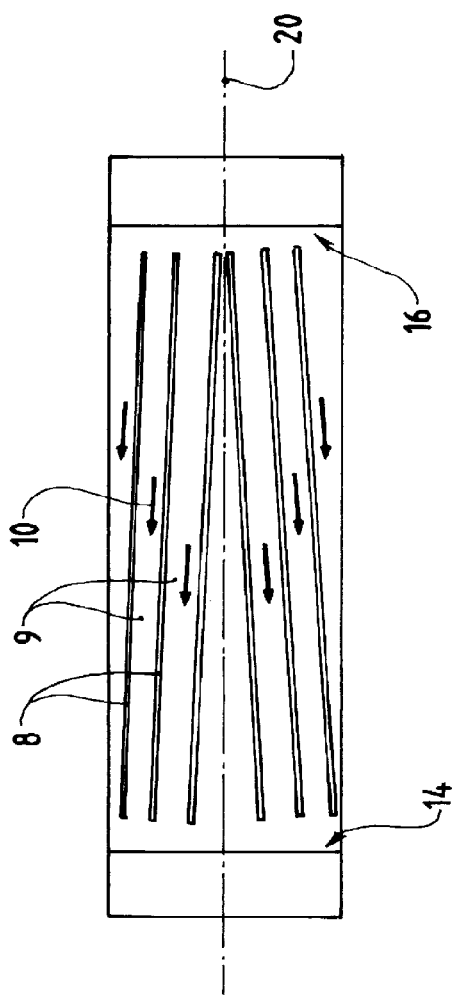
FIG. 3 is a schematic view of FIG. 2, the baking carpet having been removed.

This plate or this baking carpet extends, therefore, in the embodiment described above, above the slides 8, which are oriented substantially parallel to the direction of displacement of this plate or this carpet. However, in order to avoid a local wear of the latter, said slides 8 can be slightly divergent on both sides of a longitudinal median plane 20 of the oven 1 and in the direction of circulation of the fluid, as schematically shown in FIG. 2.

Figure 4:
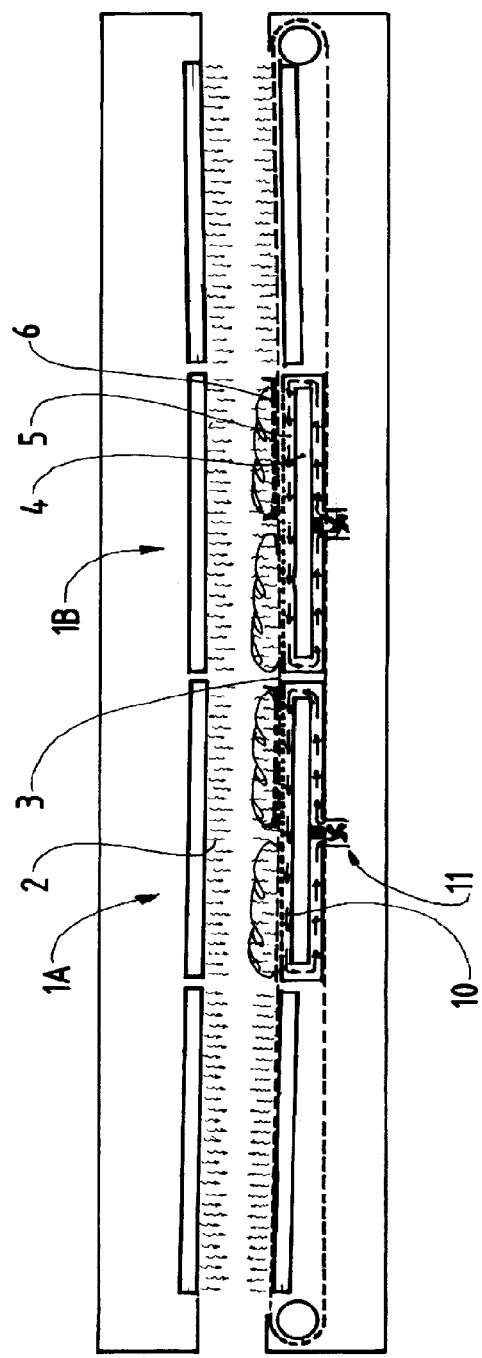
FIG. 4 is a schematic view of a baking device comprising several modules, some of which are defined by baking ovens according to the invention.

Furthermore, such a baking oven 1, according to the invention, can define a module. In other words, as can be seen in FIG. 4, in a baking device, for example of a tunnel type, this oven 1 can form a tunnel length, so that, only on a portion of the latter, the floor 3 can receive, in addition, convective heating means as described above. The present invention also relates to the case in which this tunnel consists of a juxtaposition of several modules 1A, 1B corresponding to baking ovens 1 according to the invention.

In such a configuration, it is possible to select to provide or not the floor 3 with additional heating by convection in one or more modules 1A, 1B by putting into operation their respective stirring devices 12. In FIG. 4, the stirring means 12 of module 1A are put in to operation, whereas the stirring means 12 of module 1B are not.

As already indicated above, the invention extends to any type of baking oven, for example and non-exhaustively, single- or multi-stage tunnel ovens, traditional ovens or ovens with movable or fixed ovens.

I claim:

1. A baking oven for bread, patisserie and pastry products, the baking oven comprising:

at least one baking chamber having a movable floor and a baking support;

a radiant heating means having a floor hotplate positioned under said movable floor so as to define a space therebetween, said radiant heating means in association with an air moving device for causing a closed-circuit convective circulation path of a heating fluid through said space and around said floor hot plate, said movable floor being permeable so as to allow complementary heating by convection, said radiant heating means and said air moving device for convectively contacting the products with the heating fluid through said movable floor without penetrating into said baking chamber, said movable floor being supported by an upper edge of slides affixed to and extending above said floor hotplate so as to form channels suitable for convection of said heating fluid, said slides being oriented vertically substantially parallel to a direction of movement of said movable floor such that said channels define the closed-circuit convective circulation path of the heating fluid parallel to the direction of movement of said movable floor.

2. The baking oven of claim 1, said radiant heating means for heating said floor by radiation through said space by circulation of said heating fluid by said floor hotplate.

3. The baking oven of claim 1, said movable floor being defined by an open worked plate in spaced relation to said floor hotplate.

4. The baking oven of claim 1, said movable floor being defined by a baking carpet in spaced relation to said floor hotplate.

5. The baking oven of claim 1, said movable floor being defined by a grid in spaced relation to said floor hotplate.

6. The baking oven of claim 1, further comprising:

means for convectively closed-circuitedly circulating said heating fluid in said space.

7. The baking oven of claim 6, said means for convectively closed-circuitedly comprising:

a suction mouth at one end of said movable floor;

a discharge mouth at an opposite end of said movable floor; and a stirring device positioned between said suction mouth and said discharge mouth such that said heating fluid passes therethrough.

8. The baking oven of claim 7, said slides extending from said discharge mouth to said suction mouth.

9. The baking oven of claim 1, said slides being slightly divergent on opposite sides of a longitudinal median plane of the baking chamber in a direction of circulation of said heating fluid.

10. The baking oven of claim 1, said at least one baking chamber comprising a plurality of baking chambers connected together in a modular manner.

* * * * *